(12) United States Patent
Liu

(10) Patent No.: US 6,439,785 B1
(45) Date of Patent: Aug. 27, 2002

(54) KEYBOARD HAVING CHANGEABLE DECORATION

(75) Inventor: Chung Shen Liu, SanChong (TW)

(73) Assignee: Behavior Tech Computer Corporation, Taipei (TW)

( * ) Notice: Subject to any disclaimer, the term of this patent is extended or adjusted under 35 U.S.C. 154(b) by 0 days.

(21) Appl. No.: 09/781,259

(22) Filed: Feb. 13, 2001

(51) Int. Cl.[7] ............................ B41J 5/10; G06F 3/02
(52) U.S. Cl. .................. 400/472; 400/477; 345/168; 341/22
(58) Field of Search .................. 400/472, 477, 400/487; 345/168, 169; 361/680; 341/22, 23, 28; 235/145, 146, 145 A; 705/25

(56) References Cited

U.S. PATENT DOCUMENTS

| | | | | |
|---|---|---|---|---|
| 5,810,486 A | * | 9/1998 | Hayama et al. | 400/61 |
| 6,259,597 B1 | * | 7/2001 | Anzai et al. | 345/169 |
| 6,301,100 B1 | * | 10/2001 | Iwata | 345/169 |
| 6,396,483 B1 | * | 5/2002 | Hiller | 345/168 |
| 2002/0063691 A1 | * | 5/2002 | Rogers et al. | 345/168 |

FOREIGN PATENT DOCUMENTS

| | | | | |
|---|---|---|---|---|
| JP | 10157255 A | * | 6/1998 | B41J/29/42 |
| JP | 2000029608 A | * | 1/2000 | G06F/3/02 |

* cited by examiner

*Primary Examiner*—Dan Colilla
(74) *Attorney, Agent, or Firm*—Rosenberg, Klein & Lee

(57) ABSTRACT

A keyboard includes a keyboard body similar to a traditional keyboard. The keyboard body has an edge from which an additional portion extends. The portion has a top face on which an EL panel or a thin plate having patterns and/or figures printed thereon is placed. A transparent cover is openably attached to the portion for covering the top face and thus housing the EL panel or the thin plate. The cover may be hinged to the portion whereby it is movable between a closed position and an open position. Alternatively, the cover is releasably attached to the portion whereby the cover can be removed for replacing a new EL panel or a new thin plate having different patterns printed thereon. The EL panel or the printed thin plate serves the purpose of decoration and enhances the appeal of the keyboard to the general consumers.

3 Claims, 5 Drawing Sheets

KEYBOARD HAVING CHANGEABLE DECORATION

FIELD OF THE INVENTION

The present invention generally relates to a keyboard, such as a computer keyboard, and in particular to a keyboard including a changeable decoration for enhancing the appeal of the keyboard to the general consumers.

BACKGROUND OF THE INVENTION

A keyboard is one of the most commonly used input means of a computer system. Most of the computer keyboards have a thin rectangular configuration with keys or pushbuttons movably supported on a top face thereof Function keys and indicators are also formed on the top face of the keyboard but are in general separated from the regular alphanumeric keys.

The conventional keyboards suffer a common disadvantage. They are in general not very appealing to the general consumers. The conventional keyboards are designed in consideration of their functions only. Decoration was not taken into account in designing the keyboards. In the current, very competitive computer market, commercial success may reside on the appeal of a product to the general consumers. It is thus desired to enhance the appeal of a keyboard to the general consumers.

SUMMARY OF THE INVENTION

Accordingly, an object of the present invention is to provide a keyboard including an additional decorative device for enhancing the appeal of the keyboard to the general consumers.

Another object of the present invention is to provide a keyboard having a changeable decoration for allowing a user to change different decoration for showing personal styles.

To achieve the above objects, in accordance with the present invention, there is provided a keyboard comprising a keyboard body having an edge from which an additional portion extends. The portion has a top face on which an electroluminescence (EL) panel or a thin plate having patterns and/or figures printed thereon is placed. A transparent cover is openably attached to the portion for covering the top face and thus housing the EL panel or the thin plate. The cover may be hinged to the portion whereby it is movable between a closed position and an open position. Alternatively, the cover is releasably attached to the portion whereby the cover can be removed for replacing a new EL panel or a new thin plate having different patterns printed thereon. The EL panel or the printed thin plate serves the purpose of decoration and enhances the appeal of the keyboard to the general consumers.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
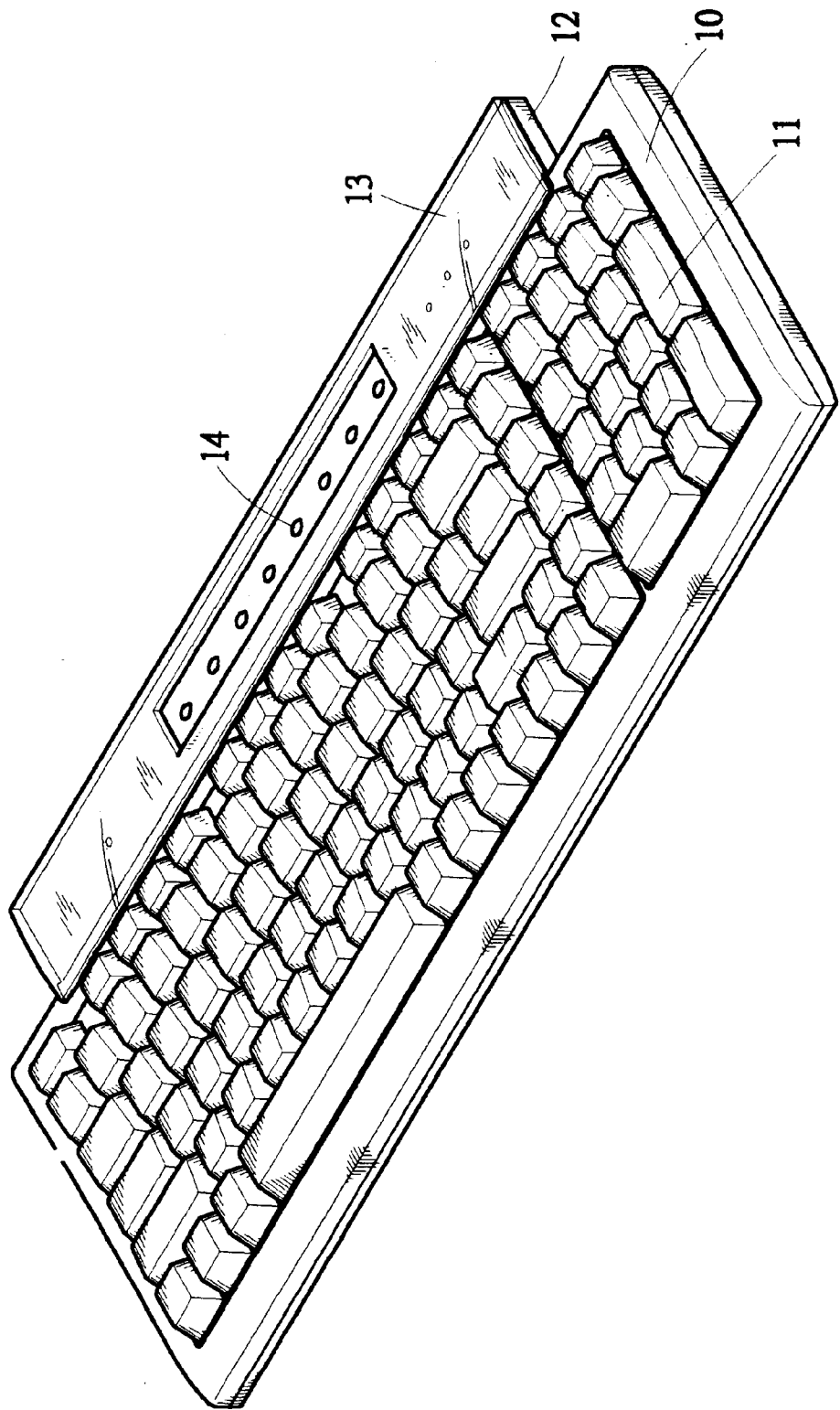
FIG. 1 is a perspective view of a keyboard constructed in accordance with the present invention with a cover of a decoration device thereof being in closed condition.
Figure 4:
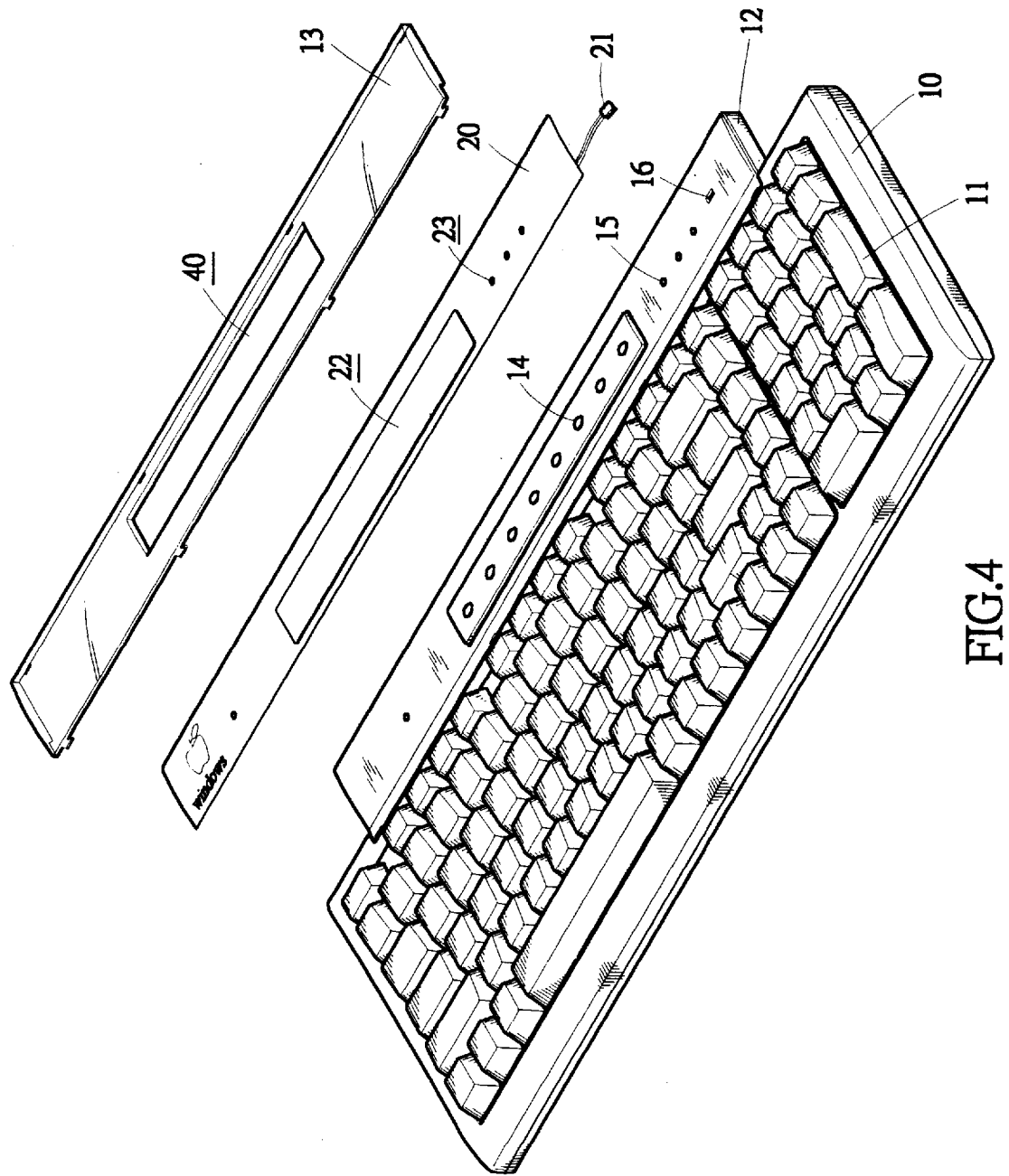
FIG. 4 is an exploded view of the keyboard of the present invention in which the decoration device comprises an electroluminescence (EL) panel.
Figure 5:
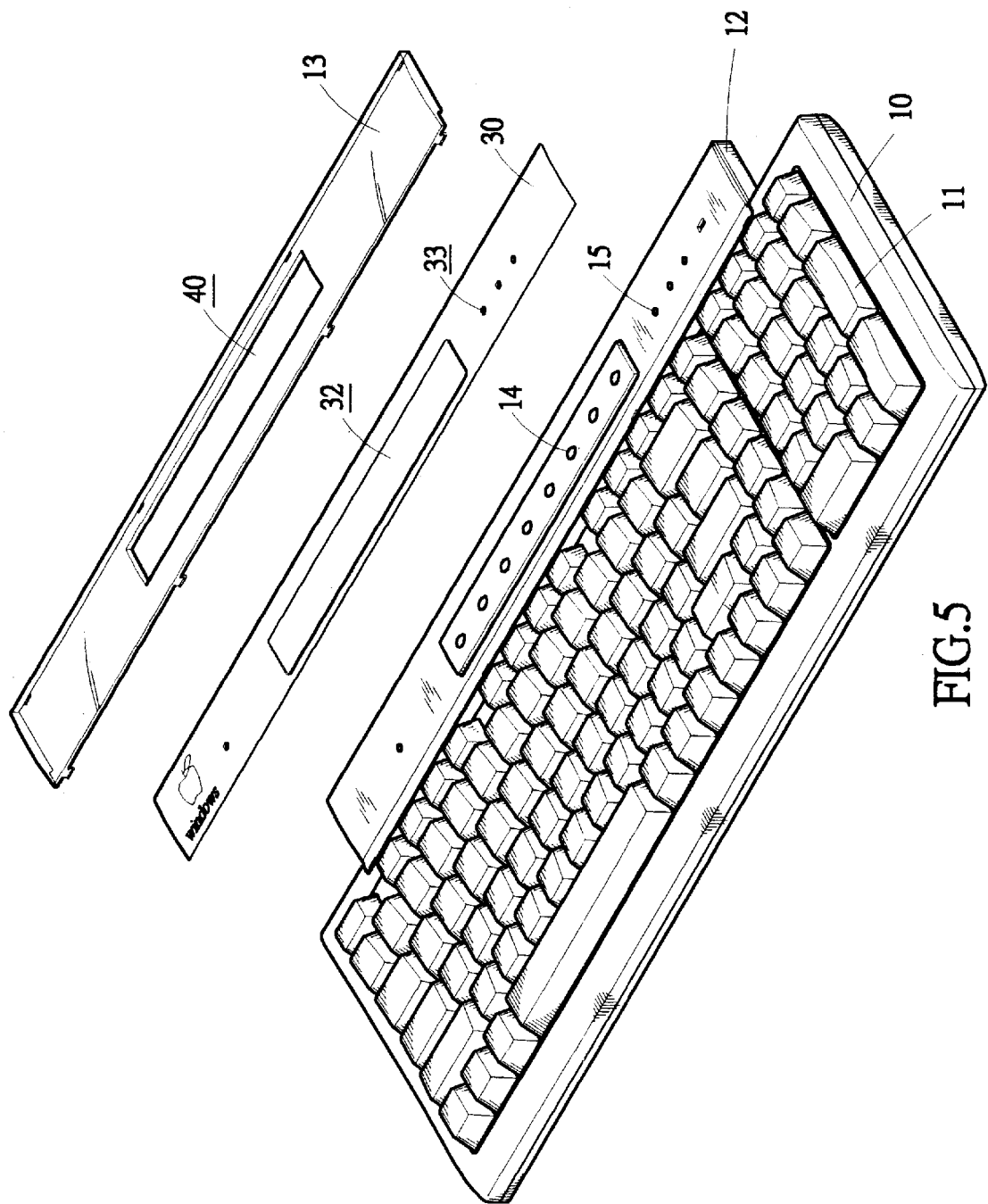
FIG. 5 is an exploded view of the keyboard of the present invention in which the decoration device comprises a decorative plate having patterns and/or figures printed thereon.

With reference to the drawings and in particular to FIGS. 1, 4 and 5, a keyboard constructed in accordance with the present invention comprises a body 10 similar to traditional keyboards, having front and rear edges and lateral edges connected between the front and rear edges. An extension or an additional portion 12 is formed on one of the edges of the body 10, such as the rear edge. The extension 12 has a top face (not labeled) on which decoration means is positioned. A cover 13, made of a transparent material, such as clear plastics, is openably mounted to the top face of the extension 12 for housing the decoration means.

The decoration means may be any suitable means for providing appealing decoration of the keyboard. In an embodiment of the present invention, the decoration means comprises an electroluminescence (EL) panel 20 as shown in FIG. 4. In another embodiment of the present invention, the decoration means comprises a thin plate 30, preferably made of paper or plastics, on which decorative patterns or figures are printed as shown in FIG. 5.

Figure 2:
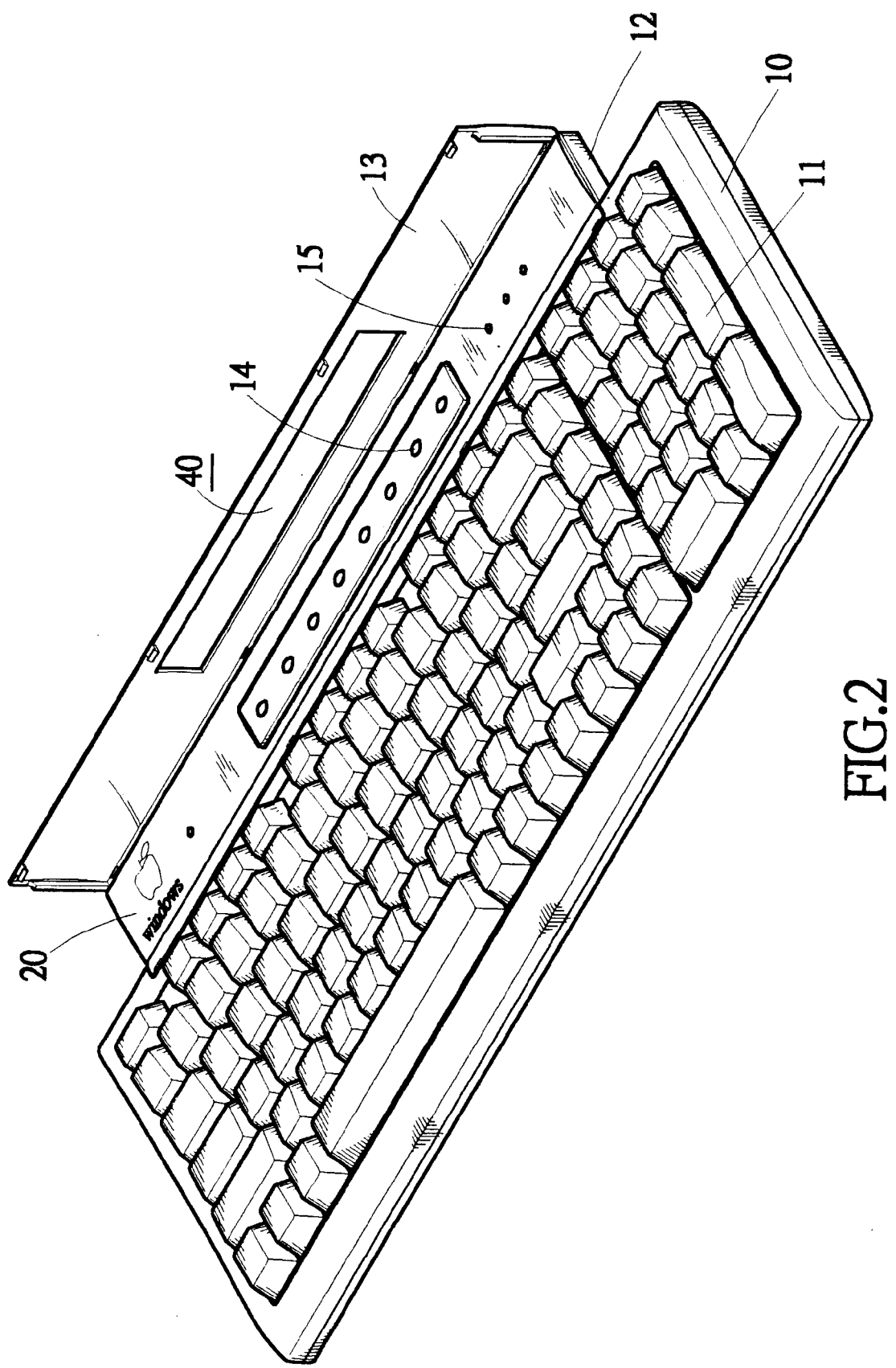
FIG. 2 is similar to FIG. 1 but the cover is opened.
Figure 3:
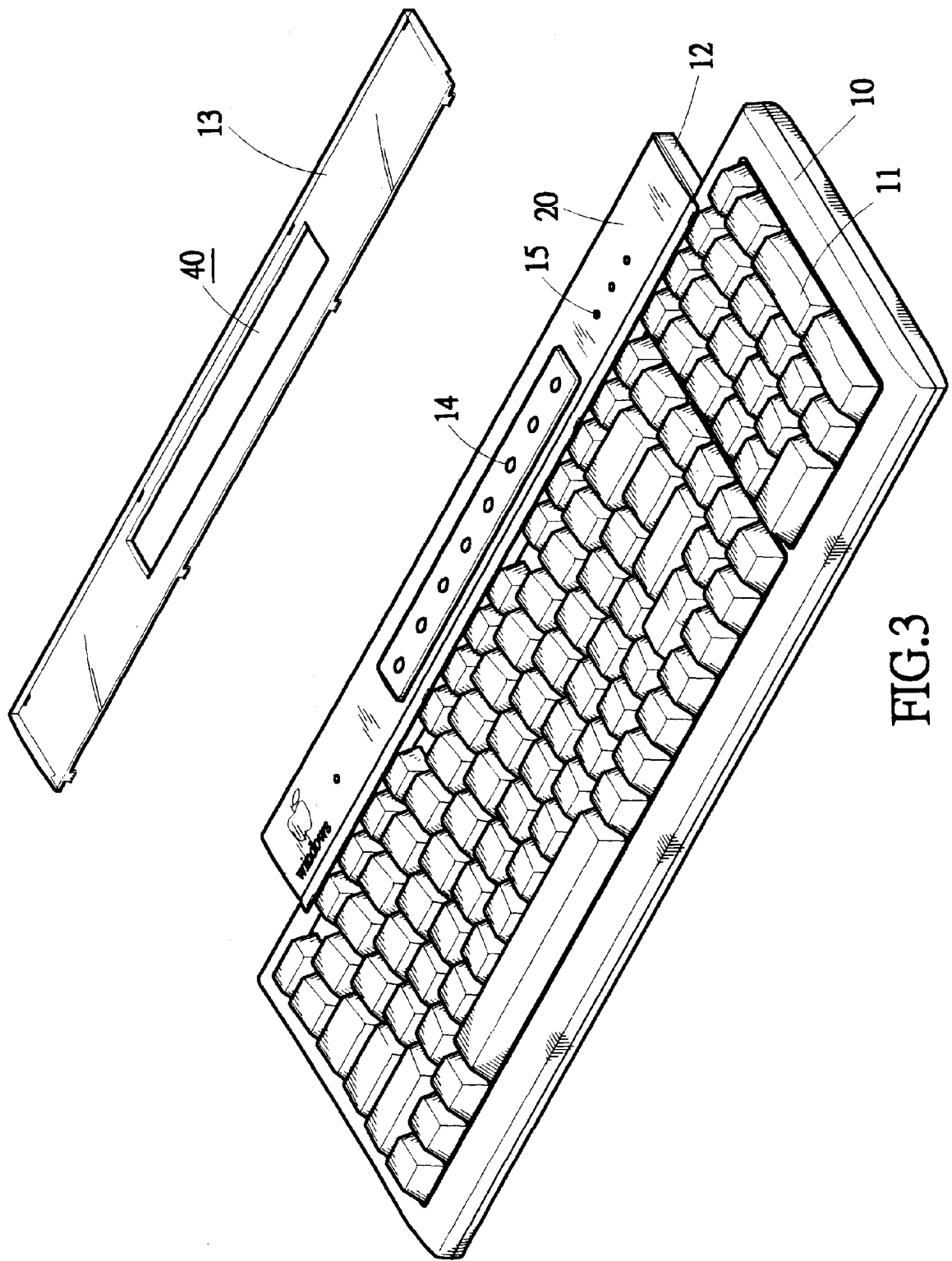
FIG. 3 is an exploded view of the keyboard of the present invention in which a cover that is completely detachable from the keyboard is shown.

The cover 13 is attached to the extension 12 in such a way to substantially completely cover and shield the decoration means positioned on the top face of the extension 12 and still allowing the decoration means to be visible due to its transparency. The cover 13 may be attached to the extension 12 by means of hinge means arranged along an edge thereof as shown in FIG. 2 whereby the cover 13 may rotate with respect to the extension 12 between a closed position where the decoration means is covered by the cover and an open position where the decoration means is exposed for being replaced by a substitute. Snap-on fasteners (not labeled) may be provided on an opposite edge of the cover for releasably securing the cover 13 in the closed position.

Alternatively, snap-on fasteners may be provided along opposite edges of the cover 13 for removably attaching the cover 13 to the extension 12 as shown in FIG. 4. This allows the cover 13 to be completely detached from the extension 12.

As shown in FIG. 4, the EL panel 20 comprises an electric plug 21 releasably and electrically engageable with a socket 16 formed on the top face of the extension 12 for supplying power to and thus driving the EL panel 20.

Function keys 14 and indicators 15 may be formed on the top face of the extension 12. Corresponding to the function keys 14, a slot 22 is formed on the EL panel 20 whereby when the EL panel 20 is placed on the extension 12, the function keys 14 are exposed through the slot 22. Similarly, a slot 32 is formed on the decorative plate 30 for exposing the function keys 14 when the decorative plate 30 is placed on the extension 12. An opening 40 corresponding to the slot 22 or 32 of the EL panel 20 or decorative plate 30 is formed on the cover 13 for allowing a user to access the function keys 14.

Holes 23 or 33 are defined in the EL panel 20 or the decorative plate 30 for exposing the indicators 15 formed on the extension 12. However, since the cover 13 itself is transparent, no corresponding holes are defined in the cover 13 to expose the indicators 15.

Although the extension 12 is shown formed on the rear edge of the keyboard body 10, it is understood that the extension may be formed any other edges of the keyboard board 10, such as one of the lateral edges of the keyboard body 10. Furthermore, it is apparent to those skilled in the art to arrange the indicators 15 and the function keys 14 on the keyboard body 10 rather than the extension 12. In that case, the slot 22 (32) and the holes 23 (33) of the EL panel 20 (the decorative plate 30) and the opening 40 of the cover 13 may be eliminated.

The EL panel 20 may be programmed to display different images for decoration purposes. Similarly, different patterns or figures may be selectively printed on the decorative plate 30. This enhances the appeal of the keyboard to general consumers.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A keyboard comprising:

a keyboard body; and decoration means, the decoration means including:
- a portion mounted to the keyboard body and having a face, a decorative panel positioned on the face of the portion, the decorative panel comprising an EL panel having an electrical plug electrically connect able to a socket defined in the portion, and
- a cover mounted to the portion, the cover being movable between a closed position where the cover substantially shields the decorative panel and the face of the portion and an open position where the decorative panel is exposed.

2. A keyboard comprising:

a keyboard body; and decoration means, the decoration means including:
- a portion mounted to the keyboard body and having a face, a decorative panel positioned on the face of the portion, the decorative panel comprising a plate on which decorative patterns and figures are printed, and
- a cover mounted to the portion, the cover being movable between a closed position where the cover substantially shields the decorative panel and the face of the portion and an open position where the decorative panel is exposed.

3. A keyboard comprising:

a keyboard body; and decoration means, the decoration means including:
- a portion mounted to the keyboard body and having a face, the face having function keys and indicators disposed thereon, a decorative panel positioned on the face of the portion, the decorative panel defining a slot for exposing the function keys and a plurality of holes for exposing the indicators, and
- a cover mounted to the portion, the cover being movable between a closed position where the cover substantially shields the decorative panel and the face of the portion and an open position where the decorative panel is exposed, the cover having an opening formed therein in correspondence with the slot for allowing manual access to the function keys.

* * * * *